Figure 1:
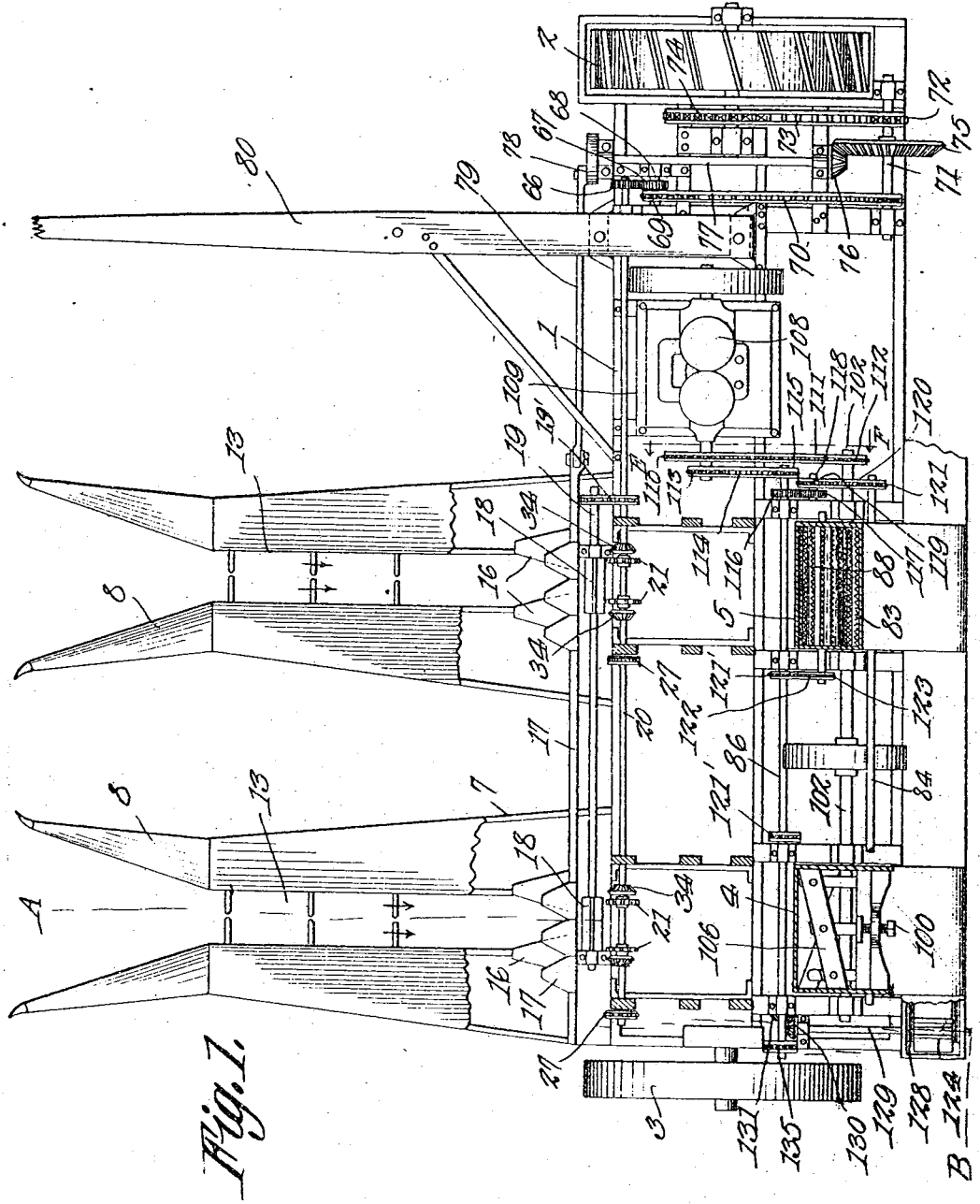

J. S. SPANGLER.
MACHINE FOR HARVESTING AND CUTTING ENSILAGE.
APPLICATION FILED JAN. 20, 1914.

1,117,460.

Patented Nov. 17, 1914.
5 SHEETS—SHEET 1.

James S. Spangler
Inventor,
by C. A. Snow & Co.
Attorneys.

Witnesses

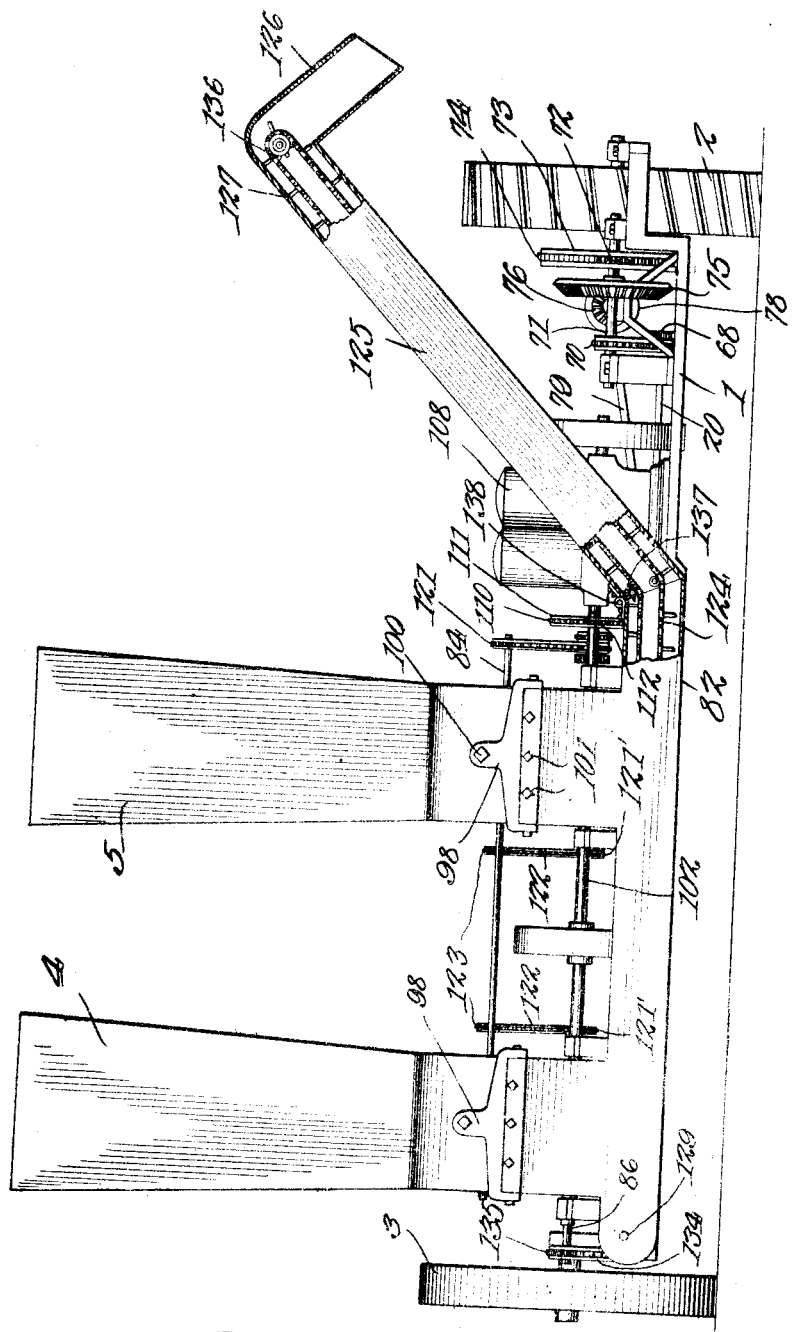

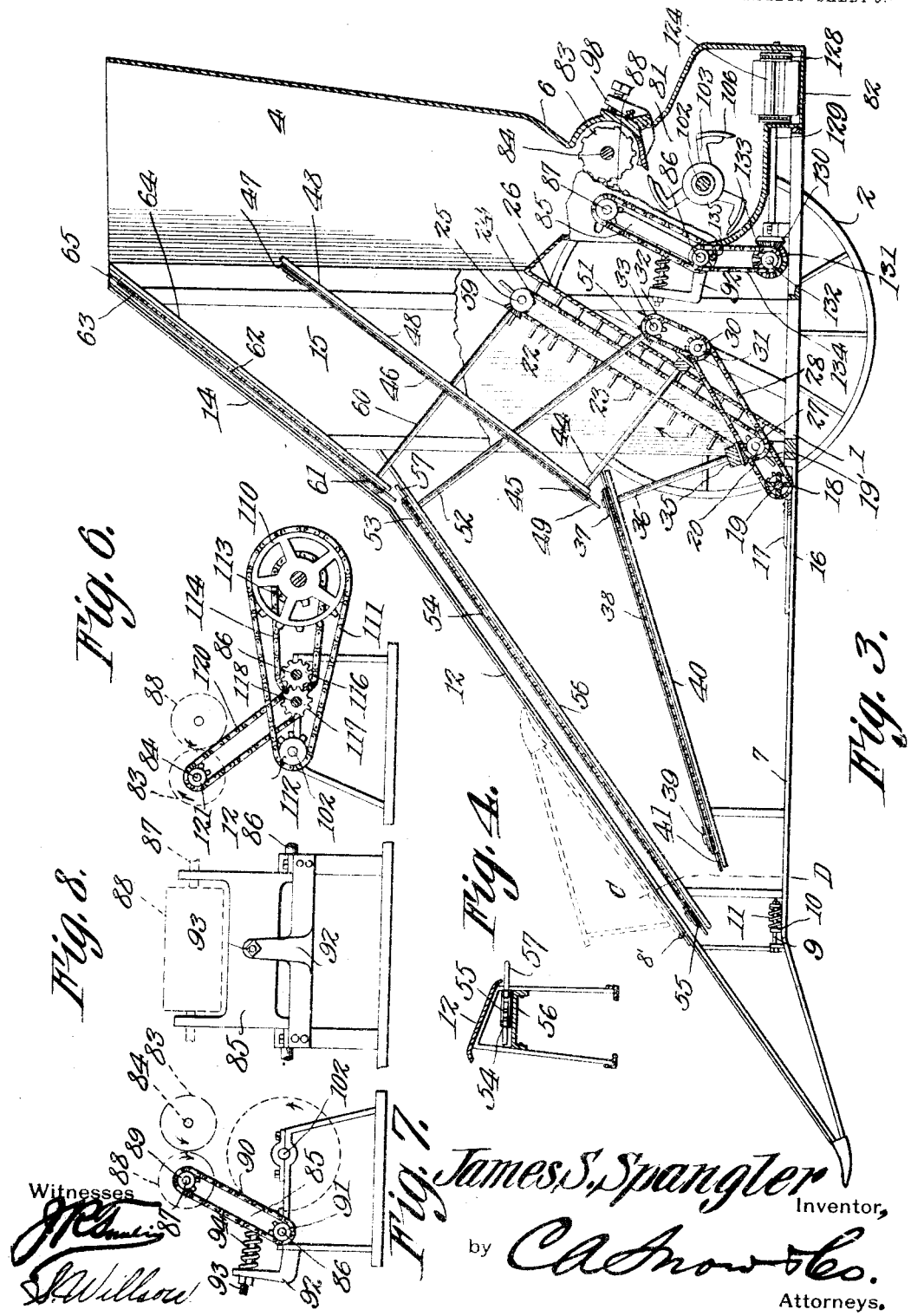

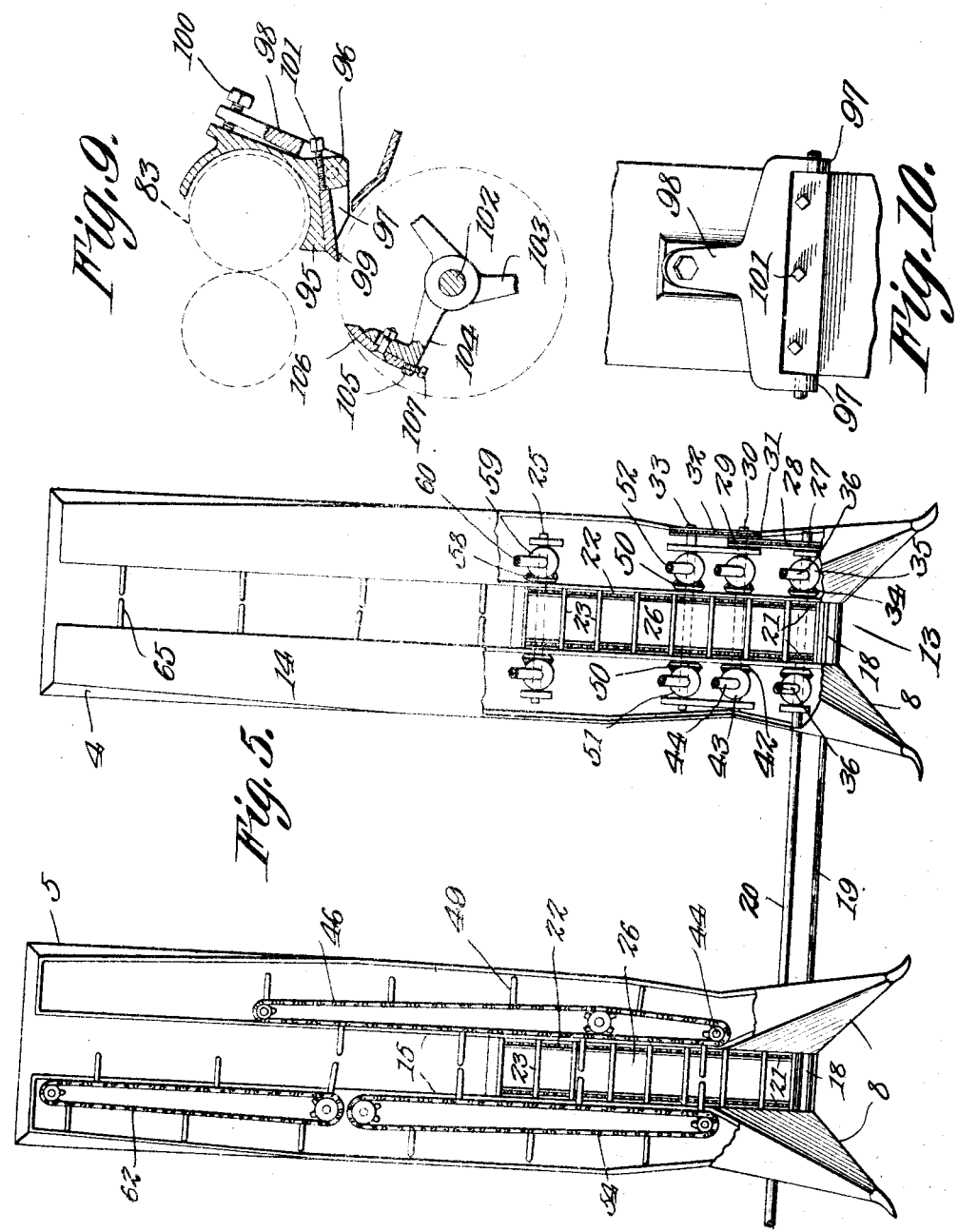

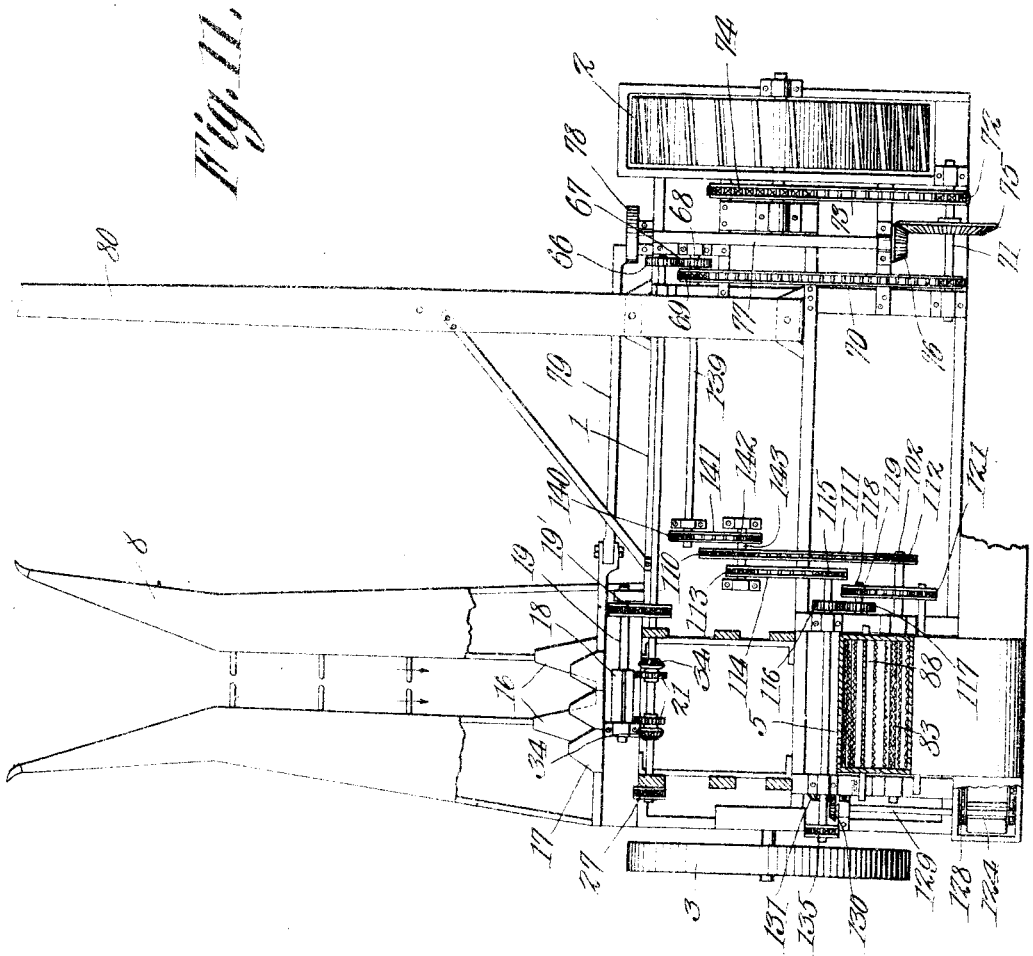

UNITED STATES PATENT OFFICE.

JAMES SAVAGE SPANGLER, OF CLINTON, MISSOURI.

MACHINE FOR HARVESTING AND CUTTING ENSILAGE.

1,117,460.  Specification of Letters Patent.  Patented Nov. 17, 1914.

Application filed January 20, 1914.  Serial No. 813,254.

*To all whom it may concern:*

Be it known that I, JAMES SAVAGE SPANGLER, a citizen of the United States, residing at Clinton, in the county of Henry and State of Missouri, have invented a new and useful Machine for Harvesting and Cutting Ensilage, of which the following is a specification.

This invention relates to machines for harvesting and cutting up ensilage, the same being adapted to move over a field of standing corn or the like, and to cut the stalks and elevate them, while in upstanding or substantially vertical positions, to a receiver from which they are fed downwardly or butt ends first, to the cutting or comminuting mechanism.

One of the objects of the present invention is to provide in a single machine, means whereby two rows may be harvested simultaneously and the stalks quickly reduced to a comminuted state so that the ensilage thus produced can be placed compactly within the wagon, consequently reducing the number of trips necessary to carry a given amount of ensilage and also materially reducing the amount of labor required.

A further object is to provide a machine of this type which is simple and compact in construction.

With the foregoing and other objects in view which will appear as the description proceeds, the invention resides in the combination and arrangement of parts and in the details of construction hereinafter described and claimed, it being understood that changes in the precise embodiment of the intion herein disclosed, can be made within the scope of what is claimed, without departing from the spirit of the invention.

In the accompanying drawings the preferred form of the invention has been shown.

In said drawings: Figure 1 is a plan view of the machine, parts being broken away. Fig. 2 is a rear elevation, parts being broken away. Fig. 3 is a section on line A—B Fig. 1, parts being broken away. Fig. 4 is a section on line C—D Fig. 3. Fig. 5 is a front elevation of the gatherers, the top plates being broken away and certain of the parts shown in section. Fig. 6 is a section on line E—F Fig. 1. Fig. 7 is a side elevation of the mechanism employed for transmitting motion to the movable feed roll. Fig. 8 is a front elevation of the structure shown in Fig. 7. Fig. 9 is an enlarged section through a portion of the ensilage cutter. Fig. 10 is a rear elevation of the stationary cutter blade and its holding means shown in Fig. 9. Fig. 11 is a plan view of a modified form of the machine, parts being broken away.

Referring to the figures by characters of reference 1 designates a frame of any suitable construction, the same being supported at one side by a drive wheel 2 and at its other side by a wheel 3, this last named wheel if desired, being provided with means whereby the frame can be adjusted upwardly and downwardly relative thereto. Supported by the frame 1 are spaced upstanding receivers 4 and 5, each of which is open at its front and top and has a hopper-like bottom 6. A pair of gathering frames 7 is extended forward from the frame 1 adjacent the front of each of the receivers 4 and 5 and each of these gathering frames, which has its top inclined downwardly and forwardly is provided, at its front end, with a prong 8 hingedly connected thereto as at 8' and adapted to be folded upwardly and backwardly onto the gatherer. The prong may have its lower portion connected to the gatherer by means of a pin 9 slidably mounted in an ear 10 carried by the gatherer and a spring 11 may be mounted on the pin and operate as a cushion whereby the prong is permitted to swing upwardly to a limited extent relative to the gatherer but will be automatically brought back to its initial position. By detaching pin 9 from the prong, said prong can be swung upwardly to the position indicated by dotted lines in Fig. 3. As shown in Fig. 4, the gatherer has a top plate 12. This top plate is extended throughout the length of the gatherer and is inclined downwardly and inwardly toward the stalk receiving space 13 formed between the gatherers. The top of each prong and the forward portion of its gatherer are disposed in substantially the same plane but the rear portion of each gatherer is inclined upwardly and rearwardly from the front portion thereof, as indicated at 14, this rear inclined portion extending up to the top of the receiver. Each of the spaces 13 opens directly into the receiver. The inner sides of the gatherers are closed under the inclined portions 14, the sheet metal plates or the like provided for this purpose being indicated at 15. Thus it will be seen that a throat is produced between these plates 15.

A stationary cutter bar 16 is supported by the gatherers directly under the front ends of the inclined portions 14 and close to the front of frame 1, this cutter extending across the spaces 13 and coöperating with a reciprocating cutter bar 17. Arranged within each of the spaces 13 and directly back of the cutter bars is a small reel 18 mounted for rotation with a shaft 19 receiving motion through chain and sprocket mechanism 19′ from another shaft 20 extended transversely of the frame 1 back of and slightly above the shaft 19. This shaft 20 carries spaced pairs of sprockets 21, each pair being located back of one of the reels 18. These sprockets engage an endless elevator 22 having outstanding cleats 23 extending transversely thereof. The said elevator engages sprockets 24 secured to a shaft 25 which is extended transversely of the machine close to the lower ends of the open fronts of the receivers 4 and 5. An inclined board 26 is extended downwardly and forwardly parallel with the lower flight of the elevator. Sprockets 27 are secured to the shaft 20 and each of these sprockets transmits motion, through a chain 28, to a sprocket 29 secured to a short transverse shaft 30 which extends under the inclined board 26. Another sprocket 31 is secured to said shaft 30 and transmits motion through a chain 32 to another short transverse shaft 33 extending under the board 26.

Secured to the shaft 20 are bevel gears 34, these gears being arranged in pairs and one gear of each pair being located adjacent each side of the space 13 or, in other words, close to but back of the plates 15, it being understood that the elevator 22 extends between the plates 15. These gears 34 mesh with bevel gears 35 secured to the lower ends of upwardly and forwardly inclined shafts 36, the upper ends of the shafts being provided with sprockets 37. These sprockets are engaged by endless chains 38 which also engage idler sprockets 39, shafts 36 and the sprockets 39 being supported by downwardly and forwardly inclined strips 40 mounted within the gathering frame 7. Chains 38 have gathering fingers 41 outstanding therefrom and adapted to travel successively into the stalk receiving space 13 adjacent thereto. It is to be understood of course that one of these chains 38 is located within each of the gathering frames and that the inner flights of the chains move along the spaces 13 whereby the gathering fingers projecting from the chains will engage the stalks within the spaces 13.

The shaft 30 has bevel gears 42 secured thereto adjacent opposite sides of the elevator 22 and these gears mesh with bevel gears 43 secured to the lower ends of forwardly and upwardly inclined shafts 44. The said shafts are provided, at their upper ends, with sprockets 45 on which are mounted endless chains 46, these chains extending upwardly and rearwardly to idler sprockets 47 and there being supporting strips 48 along which the chains are extended. These chains 46 extend up to the open fronts of the receivers 4 and 5 respectively and they are provided with outwardly extending gathering fingers 49 similar to the fingers 41 hereinbefore referred to. These fingers are adapted to travel along the inner faces of the plates 15 so as to engage the stalks and force them rearwardly toward the receivers 4 and 5.

Shaft 33 has a pair of bevel gears 50 secured thereto and these gears mesh with gears 51 secured to the lower ends of upwardly and forwardly inclined shafts 52. These shafts are provided at their upper ends with sprockets 53 engaged by endless chains 54, the said chains being inclined downwardly and forwardly and engaging idler sprockets 55. These idler sprockets are supported by downwardly and forwardly inclined strips 56 which also constitute bearings for the shafts 52. The chains 54 are parallel with and disposed close to the top plates of the gatherers and gathering fingers 57 extend from the chains 54 and are adapted to project into the stalk receiving spaces 13.

Secured to the shaft 25 which is driven by the elevator 22, is a pair of beveled gears 58 each of which meshes with a bevel gear 59 secured to the lower end portion of a shaft 60. The shafts extend forwardly and upwardly and are provided at their upper ends with sprockets 61 engaged by endless chains 62. These chains are extended rearwardly and upwardly close to and parallel with the tops of the inclined portions 14 of the gatherers and the upper portions of the chains are engaged by idler sprockets 63. These sprockets are supported by a strip 64 which also serves as a bearing for the shaft 60 and the said chains 62 are held close to and parallel with the tops of the inclined portions 14. Gathering fingers 65 extend from the chains 62 and are adapted to travel along the inner sides of the plates 15 so as thus to engage the stalks fed between the plates.

From the foregoing description it will be apparent that when the shaft 20 is rotated in one direction so as to cause the upper flight of the elevator to travel upwardly as indicated by the arrow in Fig. 3, all of the shafts 36, 44, 52 and 60 will be rotated simultaneously so as to cause the inner flights of the various chains to move upwardly and rearwardly simultaneously.

Shaft 20 receives its motion through a gear 66 from a gear 67 secured to a shaft 68. A sprocket 69 is carried by this shaft and rotates therewith and this sprocket receives motion, through a chain 70, from a counter shaft 71 which, in turn, has a sprocket 72 driven by a chain 73 from a large sprocket 74 revoluble with the drive wheel 2. A bevel gear 75 rotates with the counter shaft 71 and meshes with a gear 76 secured to a longitudinal shaft 77 journaled on the frame 1, this shaft carrying a crank disk 78 which transmits motion, through a pitman 79, to the reciprocating cutter bar 17.

A draft tongue 80 extends forwardly from the frame, preferably close to the drive wheel 2 so that the machine can be drawn forward readily by any suitable means. Obviously during this forward movement of the machine, the wheel 2 will be rotated and motion will be transmitted therefrom through the various chains, sprockets and gears to the parts hereinbefore described so that the gathering chains will operate in unison to engage the stalks entering between the gatherers, lift them to upright positions, and hold them upright while being acted upon by the fixed and reciprocating cutters 16 and 17. As soon as the stalks have been cut in this manner, the reels 18 engage the butt ends of the stalks and lift them upwardly and rearwardly, depositing said butt ends onto the elevator 22 where they are engaged by the cleats 23. At the same time the upper and intermediate portions of the stalks are engaged by the gathering fingers on the chains 48 and 62 and the stalks are thus held upright as they are elevated upwardly and rearwardly and dropped into the receivers 4 and 5 with their butt ends upon the hopper-like bottoms 6. The stalks thus feed downwardly by gravity through the hopper-like bottoms 6 and into engagement with the mechanism provided for cutting or comminuting the stalks.

The comminuting mechanism will now be described. Arranged under each of the receivers 4 and 5 is a compartment 81 the bottom of which opens into a transversely extending trough 82. Fitted within the upper portion of the compartment 81 and close to the hopper-like bottom 6 of the receiver is a corrugated feed roll 83 secured to a revoluble shaft 84. A supporting plate 85 is pivotally mounted at its lower end upon a transverse shaft 86 extending adjacent one wall of the compartment 81 and journaled in the upper portion of this plate is the shaft 87 of a movable feed roll 88. A sprocket 89 is secured to the shaft 87 and is engaged by an endless chain 90 receiving motion from a sprocket 91 secured to the shaft 86. A bracket 92 is fixedly connected to the wall of the compartment 81 and slidably engaging this bracket is a rod 93 extending from the plate 85 and having a spring 94 thereon which bears against the bracket and again the plate and serves to press the roll 88 yieldingly against the roll 83, while at the same time permitting said roll 88 to move away from the roll 83. A concave 95 is extended under the feed roll 83 and has a depending ear 96 to which are pivotally connected jaws 97 having an arm 98 extending therefrom and outside of the compartment 81. A cutting blade 99 is clamped between the jaws 97 and the bottom of the concave 95 and the jaws are held tightly against this blade by a set screw 100 which extends through the arm 98 and bears against the wall of the compartment 81, as shown particularly in Fig. 9. An adjusting screw 101 extends through the ear 96 and bears against the blade 99 so that, by means of this screw, the said blade can be shifted beyond the concave 95 to any extent desired. As shown in Fig. 10, more than one of these screws 101 can be used. Coöperating with the blade 99 is a revoluble cutter including a shaft 102 having arms 103 each of which is provided with a head 104, there being an outstanding rib 105 along the back edge of each head. An arcuate cutting blade 106 is bolted or otherwise secured upon each head and these blades are eccentrically arranged with relation to the shaft 102, their advancing or cutting edges traveling close to the free edge of the blade 99. Adjusting screws 107 may be mounted in the ribs 105 and may be used for shifting the blades 106 upon the heads 104. A motor 108 may be supported by a platform 109 on the frame 1, this motor transmitting motion, through a sprocket 110, and a chain 111, to a sprocket 112 secured to the shaft 102 of the revoluble cutter. Another sprocket 113 is driven by the motor and transmits motion through a chain 114 to a sprocket 115 secured to the shaft 86. A gear 116 rotates with shaft 86 and meshes with a gear 117 secured to a short shaft 118 on which is secured a sprocket 119. Motion is transmitted from this sprocket through a chain 120 to a sprocket 121 secured to the shaft 84 of the roll 83. A sprocket 121' is secured to shaft 86 adjacent each of the compartments 81 and transmits motion through a chain 122 to a sprocket 123 secured to the shaft 87 of roll 88.

From the foregoing it will be seen that when the motor is operated, motion will be transmitted therefrom through the various chains, sprockets and gears to the rolls 83 and 88 so that, when the stalks are deposited in vertical or substantially vertical positions upon these rolls, they will be fed downwardly to the coöperating fixed and movable cutters and thus quickly reduced to a comminuted state, the particles being directed downwardly into the compartment 81. As the blades become worn they can be readily adjusted by the means described, as will be obvious.

For the purpose of removing the ensilage produced, an endless conveyer 124 is mounted within the trough 82 and extends through an upwardly and laterally inclined casing 125 to a discharge spout 126. This elevator is in the form of an endless belt made up of chains connected by cross cleats 127. The said chains engage sprockets 128 secured to a shaft 129 journaled within the sides of the trough at one end thereof. A gear 130 rotates with shaft 129 and meshes with a gear 131 secured to a shaft 132. This shaft has a sprocket 133 which receives motion, through a chain 134, from a sprocket 135 secured to the shaft 86. Sprockets 136 are supported in the upper end portion of the casing 125 and are engaged by the chains of the conveyer. Any suitable means, such as idler sprockets 137, can be provided for engaging the chains of the conveyer where the upper flights thereof pass into the casing 125 from the trough 82. Furthermore the casing 125 can be hingedly connected to the trough, as shown at 138 so that, when the conveyer is not being used, the casing 125 can be folded upwardly out of the way.

It will be understood of course that when the ensilage is deposited upon the conveyer it will be carried longitudinally in the trough 82 and thence into casing 125 and finally deposited into the outlet spout 126 from which it can be received by a wagon moving alongside the machine.

It will be apparent that by providing a machine such as herein described, two rows of corn can be simultaneously harvested and the cut stalks carried, while in upright position, to the receivers from which they will be fed by gravity to the comminuting mechanism. Consequently the operation of producing ensilage is greatly simplified and it becomes possible to provide mechanism which is compact and will not readily get out of order. Furthermore, this structure permits corn of any height to be harvested without changing any parts of the machine nor necessitating any adjustment. By utilizing the hinged prongs 8, they can be laid back on the gatherers, thus to permit the machine to be readily moved through gates and to be transported from place to place.

As shown in Fig. 11, a motor such as heretofore described can be dispensed with and the harvesting and comminuting mechanism can be driven by the wheel 2. This can be done in various ways. For example the shaft 68 as shown in Fig. 1, can be extended to form a long shaft 139 having a sprocket 140 from which motion is transmitted through a chain 141 to a sprocket 142 secured to a shaft 143 corresponding with the shaft on which the sprockets 110 and 113 heretofore described are mounted. Thus it will be seen that the mechanism will be properly actuated without the use of a motor and obviously the same mechanism can be used whether the machine is designed for harvesting one or two rows at a time.

What is claimed is:—

1. A machine for harvesting ensilage, including means for severing standing corn, an elevator extending upwardly from said means to convey corn in standing position, and means for lifting the severed stalks, while standing, onto the elevator.

2. A machine for harvesting ensilage, including means for elevating corn while in standing position, means adjacent the lower end of the elevator for severing standing corn, and revoluble means for engaging the severed stalks, while standing, and lifting them into standing position on the elevator.

3. A machine for harvesting ensilage, including spaced gatherers, means between the gatherers for severing standing corn, an endless inclined elevator leading from the severing means, endless gathering chains extending forwardly beyond the elevator, and endless stalk engaging chains above and substantially parallel with the elevator and back of the gathering chains, for holding severed stalks in substantially upright positions upon the elevator.

4. A machine for harvesting ensilage, including spaced gatherers, means between the gatherers for severing standing corn, an endless inclined elevator between the rear portions of the gatherers, a receiver having an open front designed to receive standing stalks from between the gatherers and from the elevator, endless stalk engaging chains carried by the gatherers and above and substantially parallel with the elevator, and additional stalk engaging chains disposed at angles to the first mentioned chains and extending forwardly in advance of the elevator, the first named chains constituting means for holding the stalks in upstanding positions on the elevator.

5. A machine for harvesting ensilage, including a receiver having an open front, spaced gatherers extending forwardly therefrom and having a stalk receiving space therebetween, an endless elevator within said space for engaging and supporting stalks in upstanding positions, means for severing standing stalks of corn, said means being adjacent the front portion of the elevator, and means mounted for rotation within said space for lifting the standing stalks from the severing means and into standing positions on the elevator.

6. A machine for harvesting ensilage, including a receiver having an open front, spaced gatherers extending forwardly therefrom and having a stalk receiving space therebetween, an endless elevator within said space for engaging and supporting upstanding stalks of corn, means within said space and adjacent the front portion of the elevator for severing standing stalks of corn, means mounted for rotation within said space for lifting the standing stalks from the severing means and into standing position on the elevator, endless chains substantially parallel with and above the elevator and coöperating therewith to move the severed stalks while in standing positions, into the receiver, and endless gathering chains extending forwardly beyond the elevator and at angles to the first mentioned chains.

7. A harvesting machine including opposed gatherers, and a prong hingedly connected at its top to the top of the front end of each gatherer, thereby to swing upwardly and backwardly onto the gatherer.

In testimony that I claim the foregoing as my own, I have hereto affixed my signature in the presence of two witnesses.

JAMES SAVAGE SPANGLER.

Witnesses:
JOHN O. GILBREATH,
ARTHUR T. DUNCAN.